US012685404B2

(12) United States Patent
Li et al.

(10) Patent No.: US 12,685,404 B2
(45) Date of Patent: Jul. 21, 2026

(54) BREWING MACHINE BEVERAGE INGREDIENT CHAMBER

(71) Applicant: Keurig Green Mountain, Inc., Burlington, MA (US)

(72) Inventors: Tsz Yin Li, Wong Chuk Hang (CN); Kin Chung Choi, Wong Chuk Hang (CN)

(73) Assignee: Keurig Green Mountain, Inc., Burlington, MA (US)

(*) Notice: Subject to any disclaimer, the term of this patent is extended or adjusted under 35 U.S.C. 154(b) by 1097 days.

(21) Appl. No.: 17/640,594

(22) PCT Filed: Sep. 22, 2020

(86) PCT No.: PCT/US2020/051947
§ 371 (c)(1),
(2) Date: Mar. 4, 2022

(87) PCT Pub. No.: WO2021/061615
PCT Pub. Date: Apr. 1, 2021

(65) Prior Publication Data
US 2022/0330740 A1      Oct. 20, 2022

Related U.S. Application Data

(60) Provisional application No. 62/905,476, filed on Sep. 25, 2019.

(51) Int. Cl.
*A47J 31/36*          (2006.01)
*A47J 31/46*          (2006.01)

(52) U.S. Cl.
CPC ........... *A47J 31/3695* (2013.01); *A47J 31/46* (2013.01)

(58) Field of Classification Search
CPC ......... A47J 31/3695; A47J 31/46; A47J 31/36
(Continued)

(56) References Cited

U.S. PATENT DOCUMENTS 5,842,407 A * 12/1998 Schmed ................... A47J 31/54
99/290
6,405,637 B1 * 6/2002 Cai ........................ A47J 31/469
99/305
(Continued)

FOREIGN PATENT DOCUMENTS

CN          103393352 A  * 11/2013
CN          103815789 A  * 5/2014
(Continued)

OTHER PUBLICATIONS

English Translation of CN 103393352 (Year: 2024).*
(Continued)

*Primary Examiner* — Woody A Lee, Jr.
(74) *Attorney, Agent, or Firm* — Wolf, Greenfield & Sacks, P.C.

(57) ABSTRACT

A brewing system may include a fluid supply system, a chamber, and a fluid outlet. The fluid outlet may be configured to pierce a capsule containing a beverage ingredient formed of solid particles. The chamber may be configured to receive and hold solid particles from the capsule without inhibiting or restricting a flow path from the fluid supply system, through the chamber, and out of the fluid outlet. In some cases, a fluid flow through the chamber may gradually empty the chamber of solid particles.

23 Claims, 10 Drawing Sheets

(58) Field of Classification Search
USPC .......................................................... 99/279
See application file for complete search history.

(56)                      References Cited

U.S. PATENT DOCUMENTS

| | | | | |
|---|---|---|---|---|
| 2016/0360919 | A1* | 12/2016 | Burrows ............... | A47J 31/407 |
| 2019/0082881 | A1* | 3/2019 | Steber ................. | A47J 31/4403 |

FOREIGN PATENT DOCUMENTS

| | | | | | |
|---|---|---|---|---|---|
| CN | 204394256 U | * | 6/2015 | | |
| CN | 109984601 A | * | 7/2019 | | |
| WO | WO2015162468 | * | 10/2015 | .............. | A47J 31/16 |
| WO | WO-2015162468 A1 | * | 10/2015 | .......... | A47J 31/3695 |

OTHER PUBLICATIONS

English Translation of CN 103815789 (Year: 2024).*
English Translation of CN 109984601 (Year: 2024).*
English Translation of CN 204394256 (Year: 2024).*
International Search Report and Written Opinion mailed Dec. 11, 2020, in connection with International Application No. PCT/US2020/051947.
International Preliminary Report on Patentability mailed Apr. 7, 2022, in connection with International Patent Application No. PCT/US2020/051947.

* cited by examiner

BREWING MACHINE BEVERAGE INGREDIENT CHAMBER

CROSS REFERENCE TO RELATED APPLICATION

This application is a national stage filing under 35 U.S.C. § 371 of International Application No. PCT/US2020/051947, filed Sep. 22, 2020, which claims the benefit of U.S. Provisional Application No. 62/905,476, filed Sep. 25, 2019. The contents of these applications are hereby incorporated by reference in their entireties.

FIELD

Disclosed embodiments are related to brewing machine beverage ingredient chambers and related methods of use.

BACKGROUND

Single serve brewing machines generally receive a sealed single serve capsule in a compartment in the brewing machine. This compartment typically includes one or more piercing elements, such as a spike or needle, which pierces the single serve capsule or otherwise opens the single serve capsule to allow fluid from the brewing machine to be introduced into the capsule. Fluid may be introduced into the capsule to prepare one or more beverages, including, but not limited to, coffee, tea, hot chocolate, and cider. In some cases, the capsule may include one or more beverage ingredients, which in some cases may be in a powdered, granular, or finely ground form.

SUMMARY

In some embodiments, a brewing machine includes a fluid supply system including a fluid outlet, the fluid outlet constructed and arranged to pierce a capsule, and a chamber in fluidic communication with the fluid supply system and positioned upstream of the fluid outlet. The chamber includes a chamber inlet, a chamber outlet, and a catch volume, where the catch volume is defined by a barrier between the chamber inlet and the chamber outlet, and where the chamber is constructed and arranged to catch solid particles in the catch volume. A liquid delivery line of the fluid supply system may be coupled to the chamber inlet, e.g., to deliver heated water to the chamber inlet. The chamber outlet may be coupled to the fluid outlet, e.g., so that heated water delivered to the chamber via the chamber inlet is delivered to the fluid outlet. Heated water may flow through the catch volume on its way to the fluid outlet, and thereafter to a capsule to form a beverage. In some cases, particles in a capsule may flow in reverse or upstream into the fluid outlet, e.g., caused by pressure and/or turbulence in the capsule. Such particles, e.g., coffee grounds, may flow from the fluid outlet into the chamber via the chamber outlet and be caught in the catch volume. The catch volume may be configured so that reverse or backflow of particles does not clog or otherwise disturb normal forward or downstream flow of water or other liquid through the chamber. In addition, the catch volume may be arranged so that solid particles are picked up by forward or downstream flow of liquid in the chamber so that the solid particles can exit the chamber, again without clogging or otherwise disturbing downstream flow of liquid in the liquid supply system.

In some embodiments, a method for operating a brewing machine includes catching solid particles in a catch volume of a chamber positioned upstream of a fluid outlet, where the catch volume is defined by a barrier between a chamber inlet and a chamber outlet of the chamber. The method also includes producing a fluid flow through a fluid supply system of the brewing machine, where the fluid flow exits the fluid supply system through a fluid outlet. Solid particles in the catch volume do not interfere with fluid flow through the fluid outlet. For example, a liquid delivery line may be coupled to the chamber inlet and provide the fluid flow through the chamber from the chamber inlet to the chamber outlet. The chamber outlet may be coupled to the fluid outlet so that fluid flow through the chamber exits the fluid outlet. Solid particles in the catch volume may not impede fluid flow through the chamber from the chamber inlet to the chamber outlet, e.g., by clogging, etc. Instead, particles may remain in the catch volume and/or be picked up by the fluid flow for exit at the fluid outlet.

In some embodiments, a method for operating a brewing machine includes piercing a capsule containing solid particles, where the capsule is pressurized, and where piercing the capsule causes at least a portion of the particles to be expelled into a fluid supply system of the brewing machine. For example, the fluid supply system may be arranged to cause fluid flow in a downstream direction into the capsule to form a beverage. However, in some circumstances particles in the capsule may flow upstream into the fluid supply system. The method includes catching the solid particles in a catch volume of a chamber positioned upstream of a fluid outlet, where the catch volume is defined by a barrier between a chamber inlet and a chamber outlet of the chamber. The method also includes producing a first fluid flow through the fluid supply system of the brewing machine, where the first fluid flow exits the fluid supply system through the fluid outlet into the capsule. The method also includes removing the capsule from the brewing machine and producing a second fluid flow through the fluid supply system to create a fluid suspension of particles in the catch volume of the chamber, where the second fluid suspension exits the fluid supply system through the fluid outlet.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figures 1, 2A:
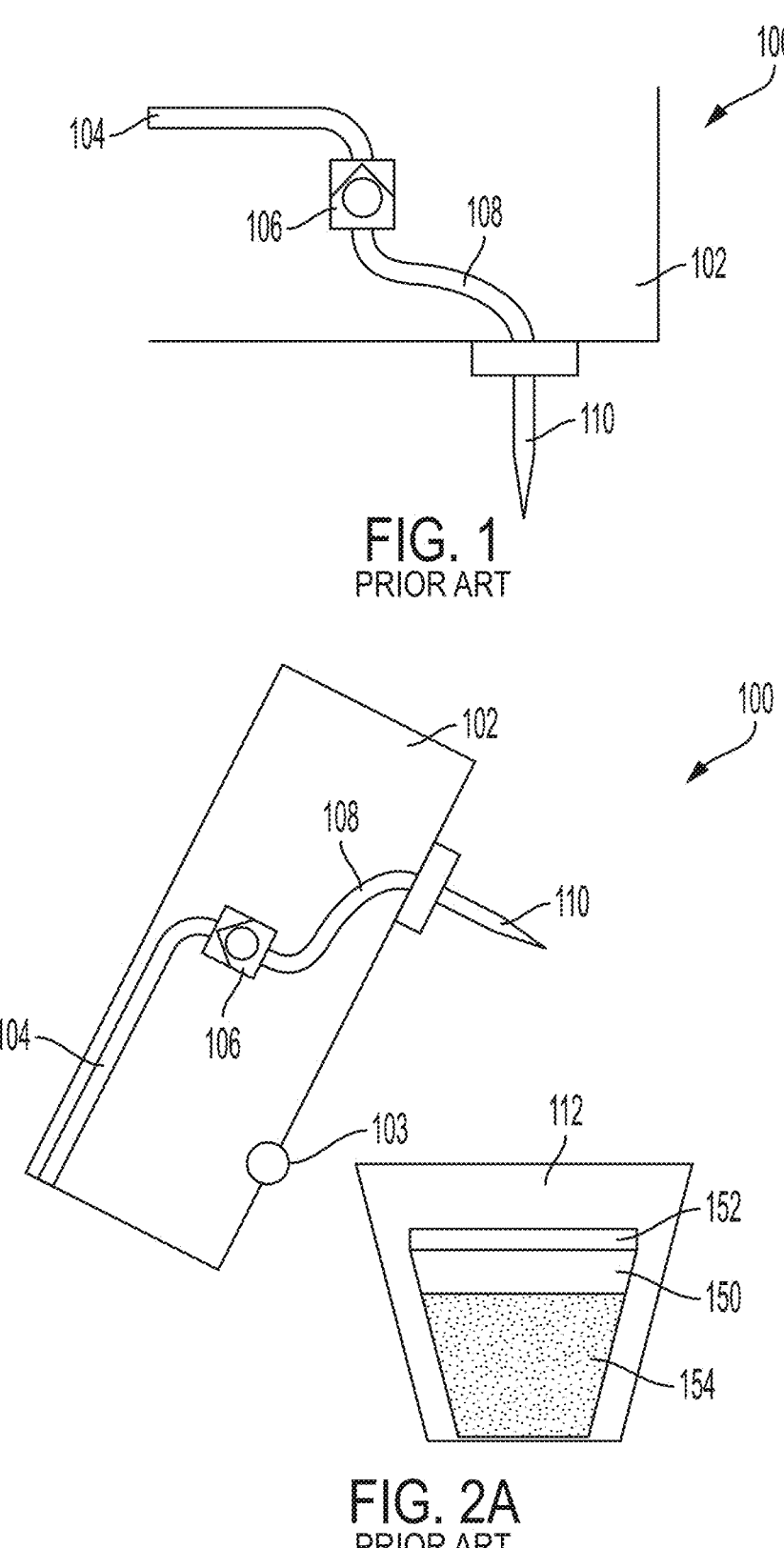
FIG. 1 is a schematic of a prior art brewing system.
FIG. 2A is a schematic of the prior art brewing system of FIG. 1 in a first state.

In conventional low pressure single serve brewers that employ one or more spikes to pierce a disposable capsule, clogs commonly occur in the fluid supply system that provides water or other liquid to the capsule to form a beverage. Due to pressure variations between the ambient air and the capsule interior or other factors, solid particles (e.g., coffee grounds) can be expelled from the capsule into the fluid supply system (e.g., water inlet line) in an upstream direction. The upstream flowing particles can cause blockage in the fluid supply system. For example, many brewers employ a piercing needle or other element that pierces a capsule to deliver water into the capsule. In many cases, pressure inside of the capsule may eject solid particles from the capsule into the fluid supply system, or pressurized water may back up into the fluid supply system such that particles flow upstream from the capsule into the piercing element and/or other upstream portions of the fluid supply system. The particles can clog the piercing element or other parts of the fluid supply system, such as a delivery line coupled to the piercing element, a check valve in the delivery line, etc.

In view of the above, the inventors have appreciated the benefits of a chamber in-line with a fluid outlet of a fluid supply system that allows particles to collect without clogging any piercing element, supply lines or other fluid supply system components. In some embodiments, such a chamber may also allow caught particles to be gradually expelled from the fluid outlet by downstream fluid flow through the chamber. The inventors have also appreciated the benefits of operating a brewing machine to alter one or more of pressure, volume, or flow rate of fluid to flush a catch volume of a chamber so collected particles can be removed from the system without clogging or other disturbance of fluid flow in the supply system.

In some embodiments, a brewing system includes a fluid supply system with a beverage ingredient chamber and a fluid outlet. The beverage ingredient chamber includes a chamber inlet, chamber outlet, and a catch volume that is formed as a portion of the chamber. The chamber inlet may be fluidly connected to receive fluid from the fluid supply system, while the chamber outlet is fluidly connected to the fluid outlet to form a path for fluid flow. The chamber inlet and chamber outlet may be spaced from one another in a horizontal direction relative to one another, such that at least a portion of a fluid flow through the chamber is horizontal flow. The catch volume is configured to trap solid particles and/or provide space for particles to collect to avoid clumping and blockage of the fluid supply system, chamber, and fluid outlet. In some embodiments, the catch volume is defined by an inclined base (e.g., barrier) of the chamber, where a lowermost portion of the inclined base is nearer the chamber inlet, and where an uppermost portion of the inclined base is nearer the chamber outlet. In such an arrangement, the catch volume may trap particles in the catch volume, or otherwise prevent solid particles in the catch volume from flowing toward the chamber outlet in a way that would clog the chamber outlet or fluid outlet. Instead, in some embodiments, the shape of the catch volume may allow solid particles in the catch volume to be entrained in a fluid flow, where they may be expelled from the chamber through the chamber outlet and fluid outlet without causing or contributing to clogs. Accordingly, the catch volume may be self-emptying or self-clearing during normal operation of the brewing system.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of a prior art brewing system 100 demonstrating a typical arrangement of a fluid supply system. As shown in FIG. 1, the brewing system includes a brew head 102 in which the fluid supply system is disposed. The fluid supply system includes a first tube 104, a check valve 106, a second tube 108, and fluid outlet 110. The first tube 104 may be connected to a pump, water reservoir, or other fluid reservoir able to provide fluid flow through the fluid supply system. The check valve 106 may prevent backflow from the fluid outlet 110 further into the fluid supply system. The second tube 108 fluidly couples the check valve to the fluid outlet 110, which may include a piercing element. In some embodiments, the check valve may be disposed closer to the fluid outlet 110 (e.g., the check valve may be directly connected to the fluid outlet). In many prior art systems, check valves were intended to inhibit the buildup of solid particles in the fluid supply system by inhibiting backflow generally. However, the inventors have recognized that such an arrangement may encourage blockages by allowing particles to pack against the check valve.

FIG. 2A is a schematic of the prior art brewing system 100 of FIG. 1 in a first state. As shown in FIG. 2A, the brew head 102 is employed in combination with a capsule compartment 112 which has received a capsule 150 containing a beverage ingredient 154 (e.g., solid particles such as coffee grounds). In the system shown in FIG. 2A, the brew head includes a hinge 103 which allows the fluid outlet 110 to be moved into an out of engagement with the capsule 150. The fluid outlet 110 of FIG. 2A is configured as a spike configured to pierce a seal 152 of the capsule 150. The state of FIG. 2A may be a typical state of the prior art brewing system during use.

Figure 2B:
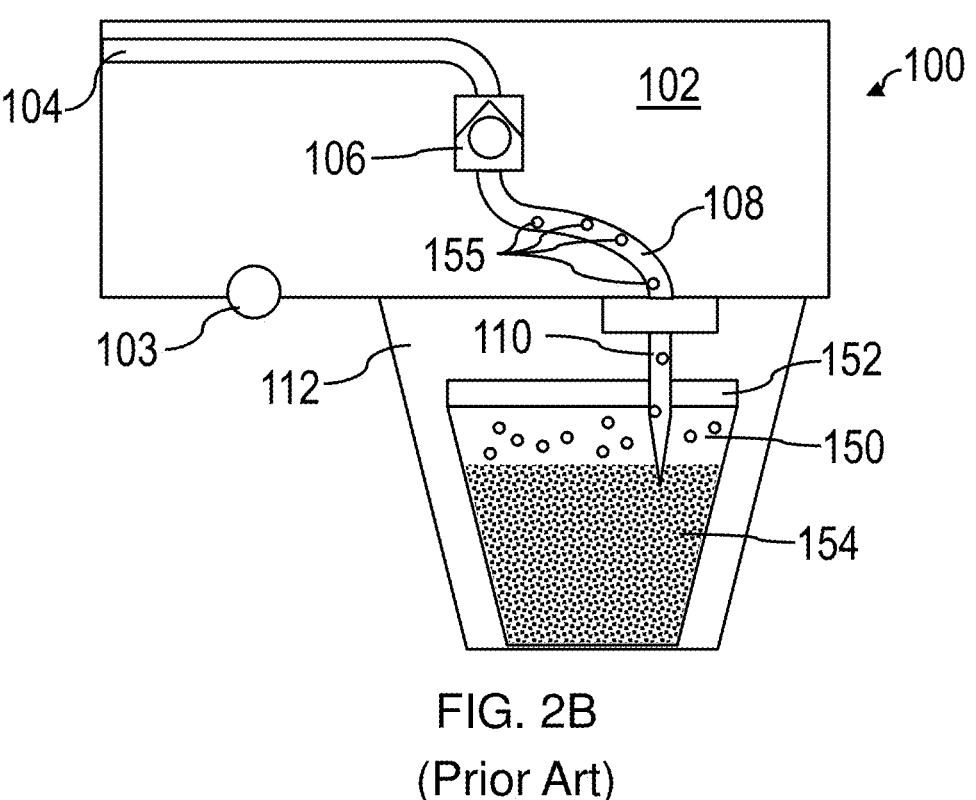
FIG. 2B is a schematic of the prior art brewing system of FIG. 1 in a second state.
Figure 2C:
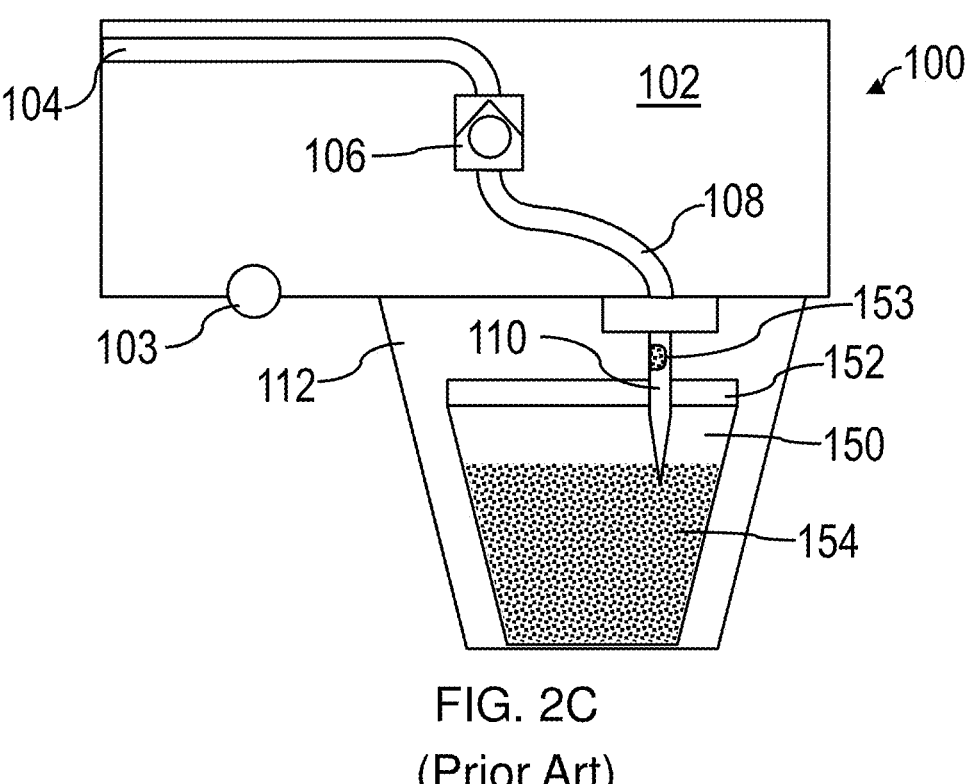
FIG. 2C is a schematic of the prior art brewing system of FIG. 1 in a third state.

FIG. 2B a schematic of the prior art brewing system of FIG. 1 in a second state where the seal 152 has been pierced by the fluid outlet 110. As shown in FIG. 2B, the capsule 150 may contain pressurized gas, which causes a plurality of the solid particles 155 to be expelled into the fluid supply system up the fluid outlet 110. The solid particles 155 may be prevented from moving deeply into the fluid supply system by the check valve 106. Accordingly, the particles may combine or adhere together near the check valve where further movement into the fluid supply system is inhibited. FIG. 2C is a schematic of the prior art brewing system of FIG. 1 in a third state showing the solid particles clumped together into a blockage 153. From the state shown in FIG. 2B, the plurality of particles 155 expelled into the fluid supply system may partially adhere to one another and/or portions of the fluid supply system. Alternatively, fluid flow through the fluid supply system may cause the particles to join in a blockage over time. For example, pressurized delivery of water into the capsule may cause turbulence and/or pressure in the capsule to cause particles to flow upstream into the fluid outlet 110, second tube 108, etc. The blockage 256, which may be located upstream of the fluid outlet 110, e.g., in the tube 108 and/or check valve 106, may inhibit or alter flow rate and/or flow pressure through the fluid outlet 110, which in turn may affect the taste of a beverage prepared from the capsule 150.

FIG. 2B a schematic of the prior art brewing system of FIG. 1 in a second state where the seal 152 has been pierced by the fluid outlet 110. As shown in FIG. 2B, the capsule 150 may contain pressurized gas, which causes a plurality of the solid particles 155 to be expelled into the fluid supply system up the fluid outlet 110. The solid particles 155 may be prevented from moving deeply into the fluid supply system by the check valve 106. Accordingly, the particles may combine or adhere together near the check valve where further movement into the fluid supply system is inhibited. FIG. 2C is a schematic of the prior art brewing system of FIG. 1 in a third state showing the solid particles clumped together into a blockage 153. From the state shown in FIG. 2B, the plurality of particles 155 expelled into the fluid supply system may partially adhere to one another and/or portions of the fluid supply system. Alternatively, fluid flow through the fluid supply system may cause the particles to join in a blockage over time. For example, pressurized delivery of water into the capsule may cause turbulence and/or pressure in the capsule to cause particles to flow upstream into the fluid outlet 110, second tube 108, etc. The blockage 153, which may be located upstream of the fluid outlet 110, e.g., in the tube 108 and/or check valve 106, may inhibit or alter flow rate and/or flow pressure through the fluid outlet 110, which in turn may affect the taste of a beverage prepared from the capsule 150.

Figure 3:
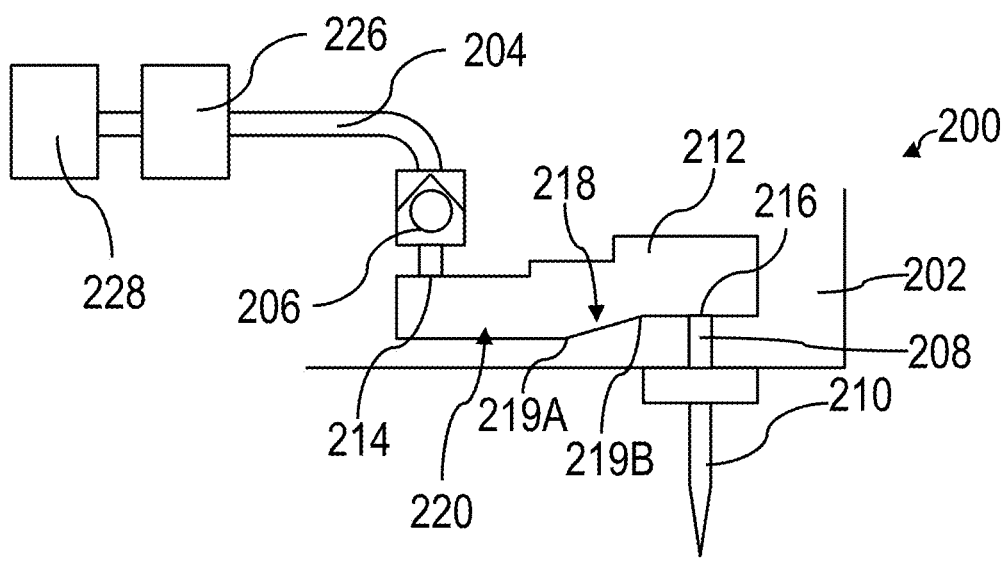
FIG. 3 is a schematic of one embodiment of a brewing system.

FIG. 3 is a schematic of one embodiment of a brewing system 200 that includes a beverage ingredient chamber 212 configured to catch solid particles and inhibit blockage formation. As shown in FIG. 3, the brewing system 200 includes a first tube or other delivery line 204, which may be connected to a pump 226, water reservoir 228, or other fluid reservoir able to produce fluid flow through the brewing system. The brewing system also includes a check valve 206, and a second tube 208. Fluidly between the second tube 208 and the check valve 206 is the beverage ingredient chamber 212. The chamber 212 includes a chamber inlet 214 and a chamber outlet 216, which are connected to the check valve 206 and second tube 208, respectively. The chamber inlet and chamber outlet are horizontally spaced from one another in this embodiment, such that there is at least a portion or component of horizontal flow through the chamber 212. The second tube 208 is connected to a fluid outlet 210, which in the depicted embodiment is arranged as a spike.

According to the embodiment of FIG. 3, the beverage ingredient chamber 212 defines a catch volume which receives and at least partially traps solid particles which may enter the fluid supply system (e.g., from a capsule). The beverage ingredient chamber includes an inclined base 218. A lowermost portion 219A of the inclined base is disposed nearer the chamber inlet 214, while an uppermost portion 219B of the inclined base is disposed nearer the chamber outlet 216. The inclined base 218 defines a catch volume 220, which is disposed below the chamber outlet 216. The catch volume 220 is also disposed below the chamber inlet 214, such that the catch volume may trap or contain solid particles while a flow path between the chamber inlet and the chamber outlet is maintained. However, in other embodiments, the catch volume may not be positioned below the chamber outlet and/or chamber inlet. The catch volume may be defined by a barrier (e.g., inclined base 218) positioned between the chamber inlet and the chamber outlet. In some embodiments, the barrier may be configured as an inclined base (e.g., a ramp). In other embodiments, the barrier may be configured as a vertical wall. According to the embodiment of FIG. 3, the inclined base 218 may be inclined at an appropriate angle to allow a fluid flow from the chamber inlet 214 toward the chamber outlet 216 to entrain solid particles positioned in the catch volume in the fluid flow. A fluid suspension of the solid particles may gradually move the solid particles over the inclined base 218 and through the chamber outlet, allowing the catch volume to slowly self-clear during normal use of the brewing system. In some embodiments, the brewing system may have a cleaning mode where fluid flow is passed through the chamber 212 to entrain solid particles and clear the catch volume 220. In some embodiments, the chamber 212 may have a separate drain or cleanout through which solid particles in the catch volume 220 may be removed. As shown in FIG. 3, the chamber inlet 214 is disposed on a top surface of the chamber, whereas the chamber outlet is disposed on a bottom surface of the chamber.

As shown in FIG. 3, the beverage ingredient chamber 212 provides a larger volume through which solid particles and fluid flow may pass, thereby inhibiting blockages of solid particles from forming. That is, the chamber 212 has a volume greater than that of the second tube 208 and fluid outlet 210. Put another way, a cross-sectional area of the chamber 212 through which flow passes is greater than a cross-sectional area of the second tube 208, fluid outlet 210, and other components of the fluid supply system disposed downstream of the check valve 206 and/or the chamber 212. (The cross-sectional area may be determined as the area of a section of the chamber or other flow space that is generally perpendicular to flow of liquid through the section.) In some embodiments, the cross-sectional area of the chamber is at least 2 times, 3 times, 4 times, 5 times, 10 times, 15 times, or 20 times greater than the cross-sectional area of any portion of the fluid supply system downstream of the chamber. Correspondingly, the cross-sectional area of the chamber may be less than 25 times, 20 times, 15 times, 10 times, 5 times, 4 times, or 3 times the cross-sectional area of any portion of the fluid supply system downstream of the chamber. Combinations of the above noted ranges are contemplated, including a cross-sectional area of the chamber between 2 and 10 times greater than the cross-sectional area of any portion of the fluid supply system downstream of the chamber 212, including the fluid outlet 210.

According to the embodiment of FIG. 3, the chamber 212 is positioned such that solid particles that pass through the fluid outlet 210 may be captured in the chamber 212.

Additionally, the interface between the chamber 212 and the second tube 208 and fluid outlet 210 does not include any inclined walls angled toward the second tube or fluid outlet that may form a funnel shape. In the embodiment of FIG. 3, the second tube 208 extends perpendicularly from the chamber 212. In some embodiments, the chamber 212 may be directly connected to the fluid outlet 210, which may also extend perpendicularly from the chamber outlet 216. In some embodiments, the chamber outlet may be positioned within 1 in, 2 in, 3 in, or 4 in of the fluid outlet 210.

Figure 4A:
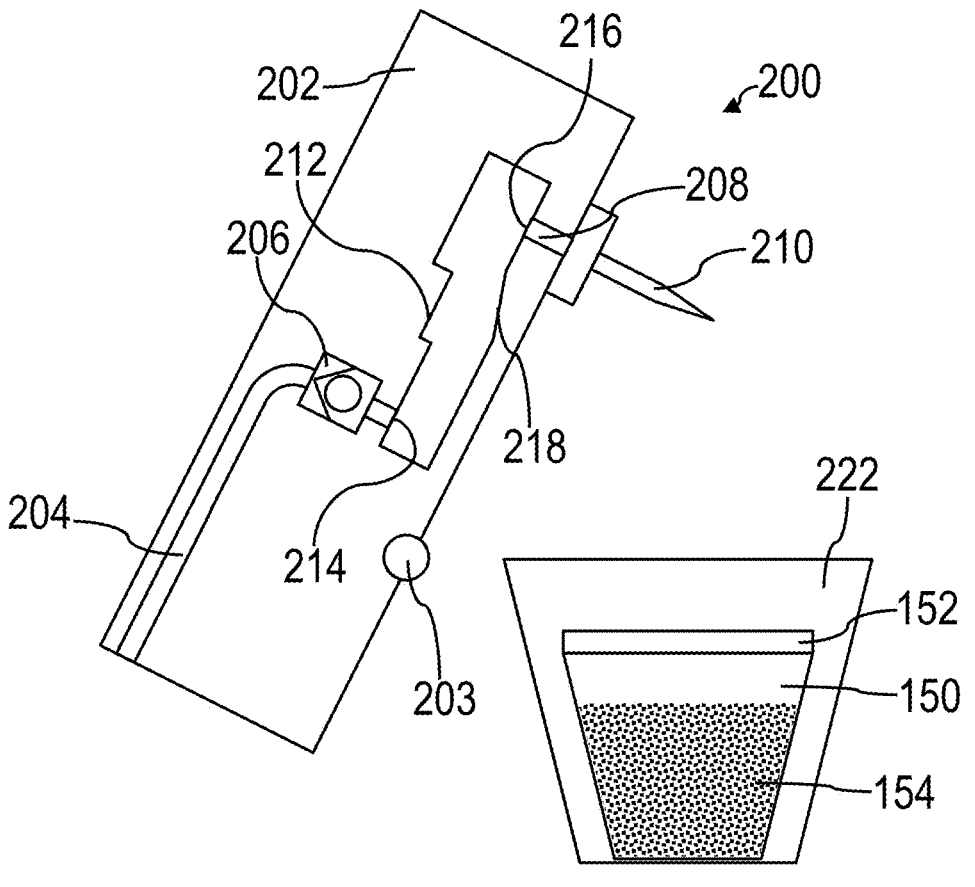
FIG. 4A is a schematic of the brewing system of FIG. 3 in a first state.

FIG. 4A is a schematic of the brewing system 200 of FIG. 3 in a first state corresponding to a pre-brew state. As shown in FIG. 4A, a brew head 202 is inclined relative to a capsule compartment 222. The brew head of FIG. 4A is rotatable about a hinge 203 to allow a user to access the compartment (e.g., to place a capsule 150 in or remove the capsule from the compartment). As shown in FIG. 4A, the compartment contains a capsule 150 which holds a beverage ingredient 154. The beverage ingredient is sealed in the capsule 150 with seal 152. According to the embodiment of FIG. 4A, the beverage ingredient may be formed of solid particles, such as coffee grounds, tea leaves, powdered beverage mix, etc. When the brew head 202 is rotated downward toward the compartment 222, the fluid outlet 210 may piece the seal 152, thereby bringing the capsule 150 into fluid communication with the fluid supply system of the brewing system.

Figure 4B:
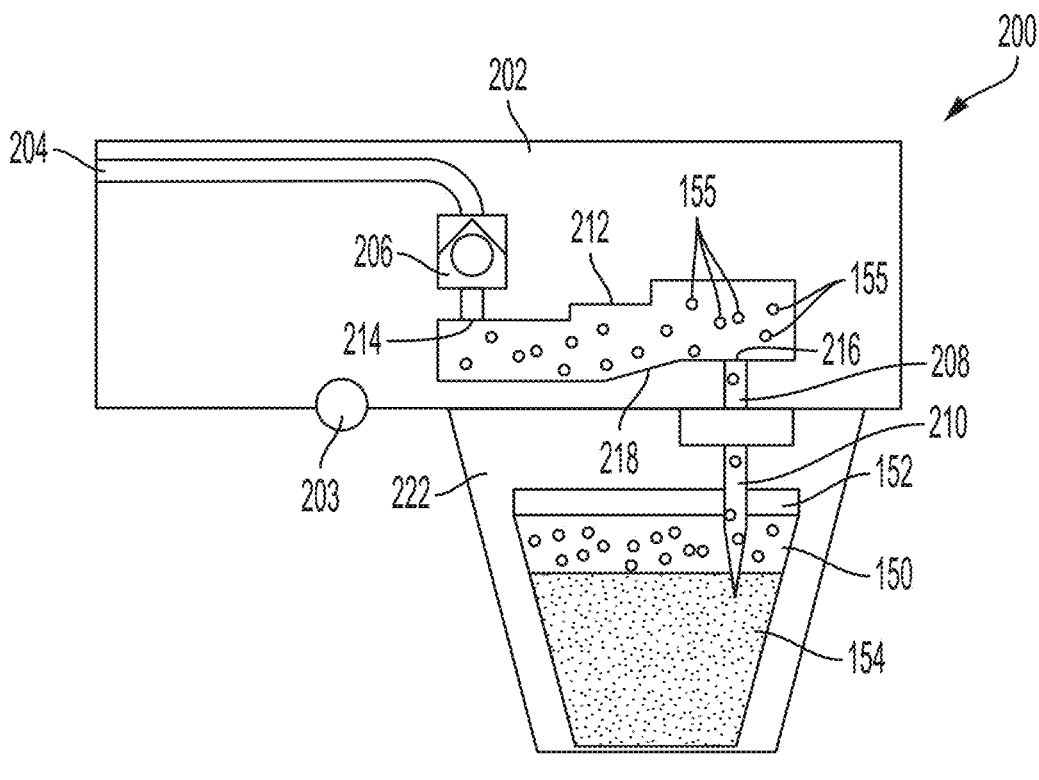
FIG. 4B is a schematic of the brewing system of FIG. 3 in a second state.

FIG. 4B is a schematic of the brewing system 200 of FIG. 3 in a second state corresponding to a state where the capsule 150 is initially pierced. As shown in FIG. 4B, the brew head 202 has been rotated downward into engagement with the compartment 222. The fluid outlet 210 has pierced the seal 152 of the capsule 150. The capsule 150 shown in FIG. 4B may have contained pressurized gas, which forces a plurality of solid particles upstream into the fluid supply system of the brewing system 200. The particles 155 are expelled from the capsule 150 up through the fluid outlet 210, second tube 208, and into the chamber 212. Depending on the pressure inside of the capsule, some particles may reach the chamber inlet 214 or check valve 206. However, as the chamber 212 offers added volume for the particles 155 to spread out, the particles may not adhere or form together to generate a blockage. Additionally, as will be discussed with reference to FIG. 4C, the chamber 212 provides volume for the particles to settle in the catch volume, such that any fluid flow has a clear flow path to the chamber outlet, even in the presence of a large volume of solid particles 155.

Figure 4C:
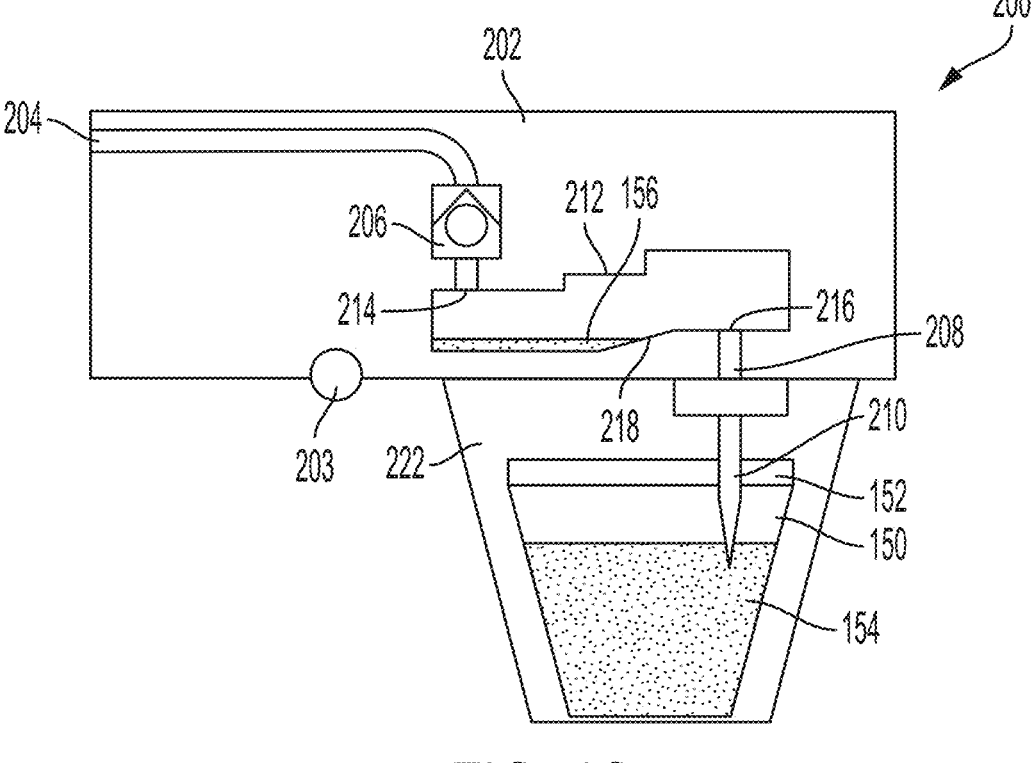
FIG. 4C is a schematic of the brewing system of FIG. 3 in a third state.

FIG. 4C is a schematic of the brewing system 200 of FIG. 3 in a third state corresponding to a pre-brewing state. As shown in FIG. 4C, the solid particles have settled into a particle layer 156 disposed in the catch volume. The inclined base 218 maintains the particle layer in the catch volume, and inhibits the movement of the whole of the particle layer toward the chamber simultaneously. Additionally, as the catch volume is disposed below the chamber inlet 214 and chamber outlet 216 (or otherwise maintains an open flow path over the inclined base 218), fluid is free to flow through the chamber 212 even in the presence of the particle layer 156.

Figure 4D:
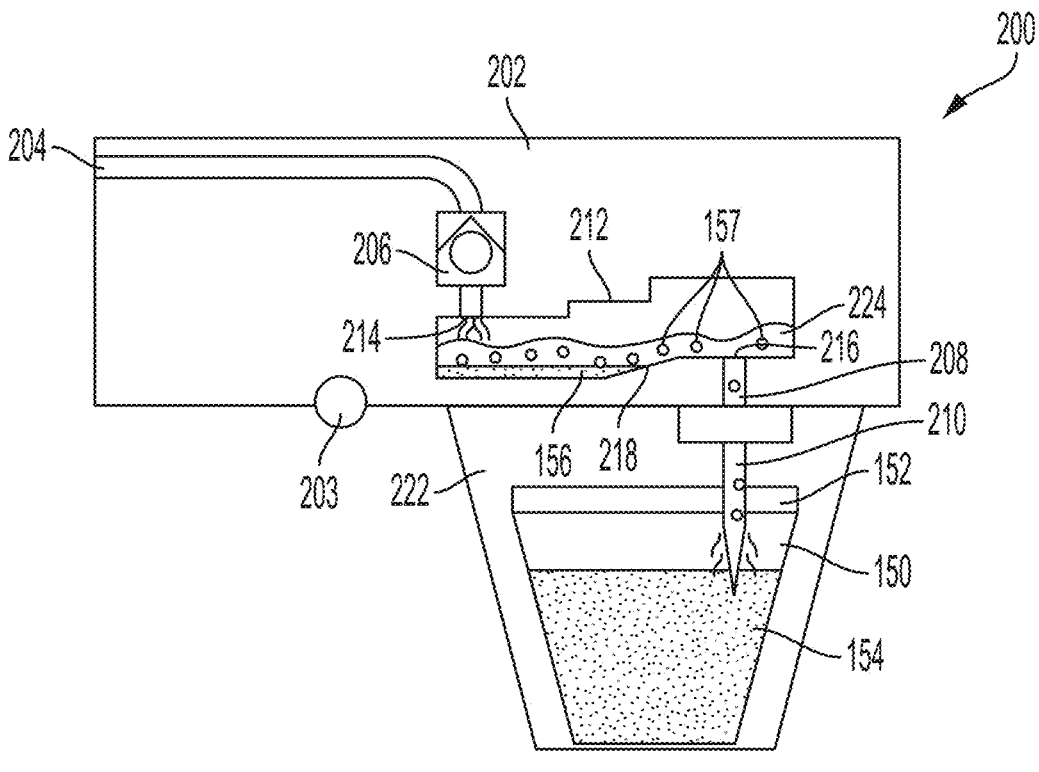
FIG. 4D is a schematic of the brewing system of FIG. 3 in a fourth state.

FIG. 4D is a schematic of the brewing system of FIG. 3 in a fourth state corresponding to a brewing state. As shown in FIG. 4D, fluid 224 (e.g., water) flows from the first tube 204, through the check valve 206, into the chamber 212, and through the fluid outlet 210 into the capsule 150. The fluid may be sourced from a fluid reservoir or supply, and may be pumped through the first tube 204 to the brew head 202 by a pump of the brewing system. The check valve 206 allows one-way flow, such that the fluid flow may enter the chamber 212, but may not flow backwards through the check valve 206. The chamber 212 provides a free flow path for the fluid 224 from the chamber inlet 214 to the chamber outlet 216, even when a particle layer 156 is disposed in the chamber. As shown in FIG. 4D, the fluid flow may entrain some particles of the particle layer to form a fluid suspension 157. This fluid suspension may gradually move particles from the particle layer from the chamber 212 through the chamber outlet 216 and ultimately back into the capsule 150. Accordingly, the particle layer 125 may be emptied or partially emptied during a normal brewing process. The fluid flow 224 may enter the capsule 150 and combine with the beverage ingredient 154 to form a beverage, which may be dispensed into a cup or other container.

In some cases, a brewing process may introduce additional solid particles into the fluid supply system of the brewing system 200. That is, the fluid flow 224 may flow into the capsule 150 at a high enough flow rate or pressure to cause backflow of particles in the fluid suspension 157 into the fluid outlet 210. In such cases, it may be desirable to employ a flushing or cleaning process, an embodiment of which will be discussed with reference to FIGS. 5A-5C.

According to the embodiment shown in FIG. 4D, the inclined base 218 of the chamber may have a suitable incline and/or height such that an appropriate amount of particles may be entrained in the fluid flow 224, without entraining so many as to form a blockage as the particles pass through the second tube 208 and fluid outlet 210. Gravity may urge a particle on the inclined base 218 toward the catch volume. Accordingly, to entrain a particle in the flow, this gravitational force on the particles must be overcome through the flow of the fluid 224. A steeper incline and/or additional height of the inclined base 218 may reduce the number of particles entrained, whereas a lesser incline and/or height may increase the number of particles entrained. In some embodiments, the angle of the inclined base relative to the horizontal may be greater than or equal to 15°, 25°, 30°, 45°, 60°, or any other appropriate angle which may depend on factors such as volume flow rate and cross sectional size of the chamber. Correspondingly, the angle of the inclined base relative to the horizontal may be less than or equal to 90°, 60°, 45°, 30°, 20°, or any other appropriate angle. Combinations of the above ranges are contemplated, including between 15° and 45°, and between 15° and 30°. Of course, any suitable angle for the inclined base may be employed, as the present disclosure is not so limited. In some embodiments, a difference in height between a lowermost portion of the catch volume (e.g., a lowermost portion of the inclined base 218) and uppermost portion of the catch volume (e.g., an uppermost portion of inclined base 218) may be greater than or equal to 0.25 in, 0.5 in, 0.75 in, 1 in, 1.5 in, 2 in, or any other appropriate distance. Correspondingly, a difference in height between a lowermost portion of the catch volume and the chamber outlet may be less than or equal to 2.5 in, 2 in, 1.5 in, 1 in, 0.75 in, 0.5 in, or any other appropriate distance.

Figure 4E:
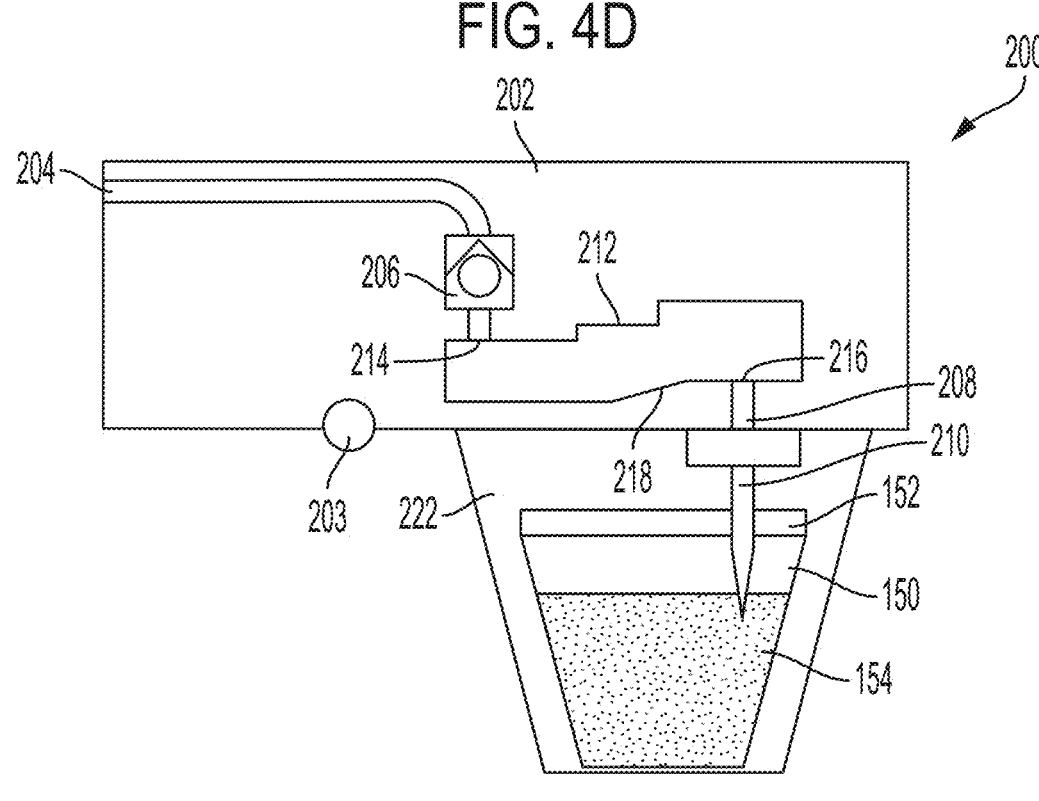
FIG. 4E is a schematic of the brewing system of FIG. 3 in a fifth state.

FIG. 4E is a schematic of the brewing system of FIG. 3 in a fifth state which may correspond to a post-brew state. As shown in FIG. 4E, the chamber 212 is emptied of particles. During the brew process shown in FIG. 4D, the fluid may entrain all of the particles disposed in the catch volume gradually throughout the brewing process and move the particles out of the fluid outlet 210. In some embodiments, the particle layer 156 may remain in the catch volume even after a brew cycle, as will be discussed with reference to FIG. 5A. Nevertheless, the presence of the particle layer 156 may not inhibit the flow path from the chamber inlet 214 to the chamber outlet 216, and accordingly does not alter the brewing process in fluid flow rate or pressure.

Figure 5A:
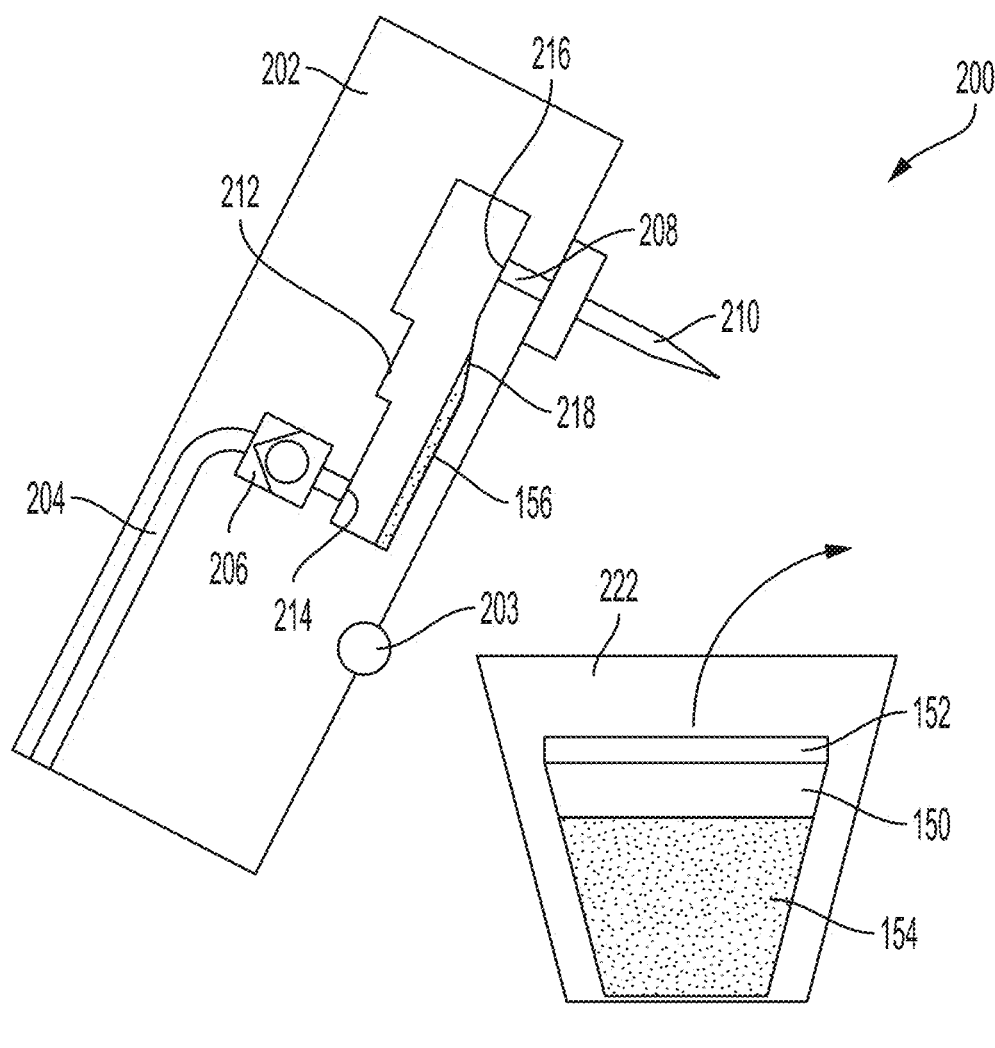
FIG. 5A is a schematic of the brewing system of FIG. 3 in a sixth state.

FIG. 5A is a schematic of the brewing system of FIG. 3 in a sixth state corresponding to a post-brew state where a particle layer 156 remains in the catch volume of the chamber 212. As shown in FIG. 5A, after a brewing process the brew head 202 may be rotated upward so that a user may gain access to the compartment 222. Once the capsule 150 is accessible to a user, the capsule may be removed from the compartment 222 as shown by the arrow.

Figure 5B:
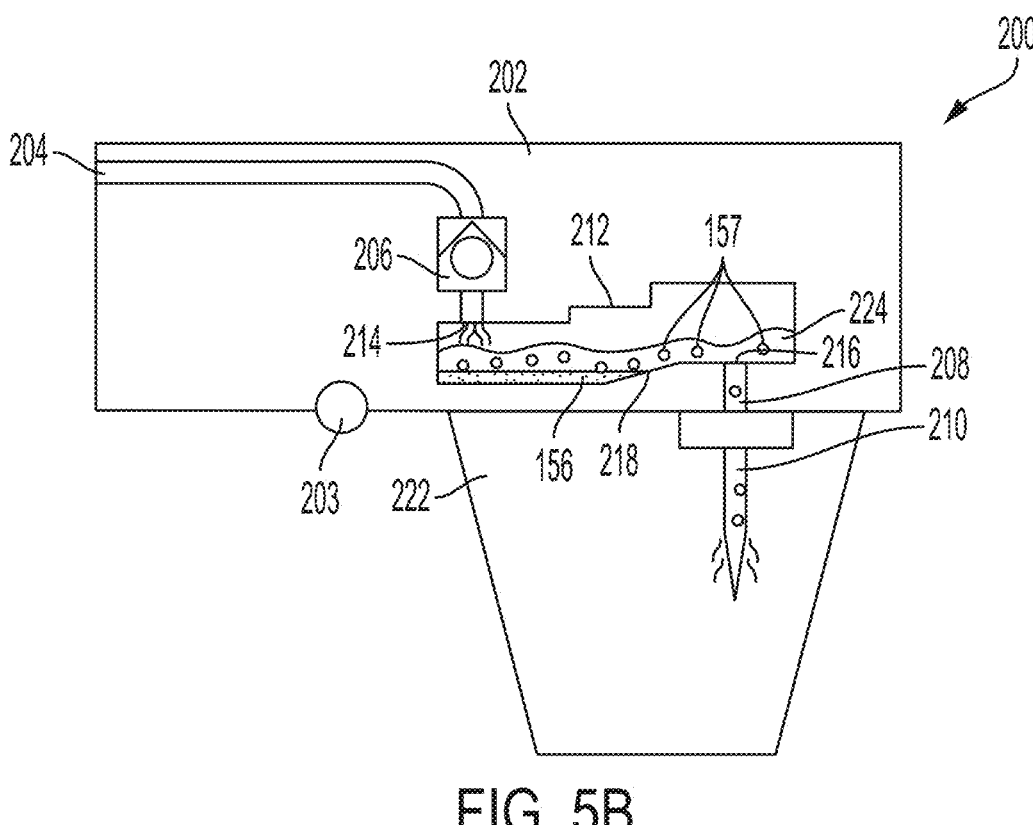
FIG. 5B is a schematic of the brewing system of FIG. 3 in a seventh state.
Figure 5C:
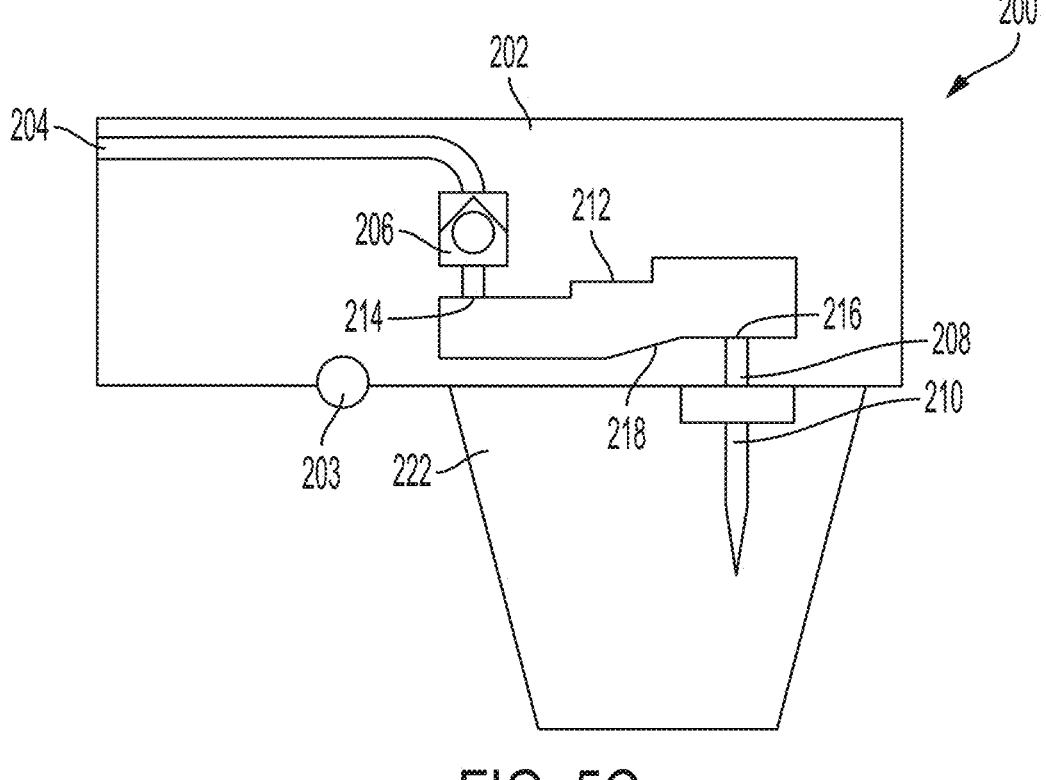
FIG. 5C is a schematic of the brewing system of FIG. 3 in a eighth state.

FIG. 5B is a schematic of the brewing system of FIG. 3 in a seventh state corresponding to a cleaning state. From the state shown in FIG. 5A, the brew head 202 may be rotated downward toward the compartment 222 while there is no capsule disposed in the compartment. Accordingly, when the brew head is engaged with the compartment, no further particles may be expelled into the fluid supply system, as there is no capsule that is pierced by the fluid outlet. Accordingly, in this state, the brewing system may generate a fluid flow 224 through the chamber to entrain particles in a fluid suspension 157 and reduce or eliminate the particle layer in the catch volume of the chamber. In some embodiments, the flow rate, flow pressure, or volume of fluid flow during the cleaning process may be greater than that of a normal brewing process. FIG. 5C is a schematic of the brewing system of FIG. 3 in a eighth state showing the brewing system 200 cleared out of the particle layer 156. That is, the chamber 212 has been emptied of solid particles.

Figure 6:
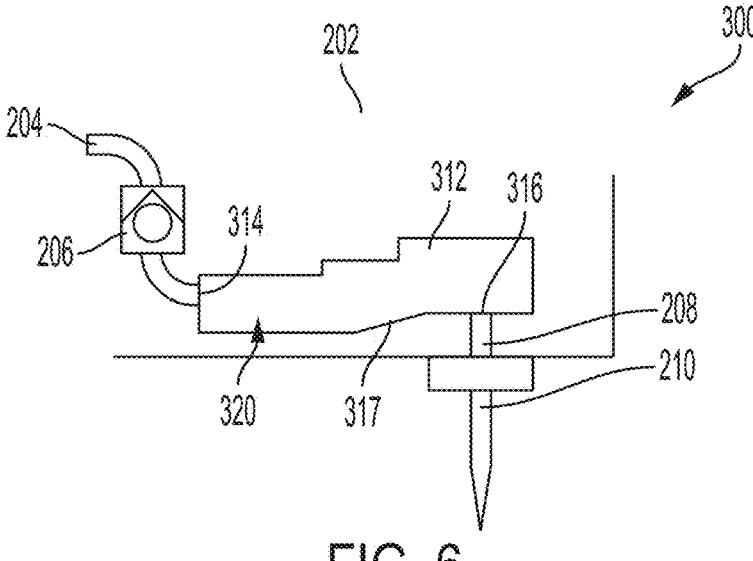
FIG. 6 is a schematic of another embodiment of a brewing system.
Figure 7:
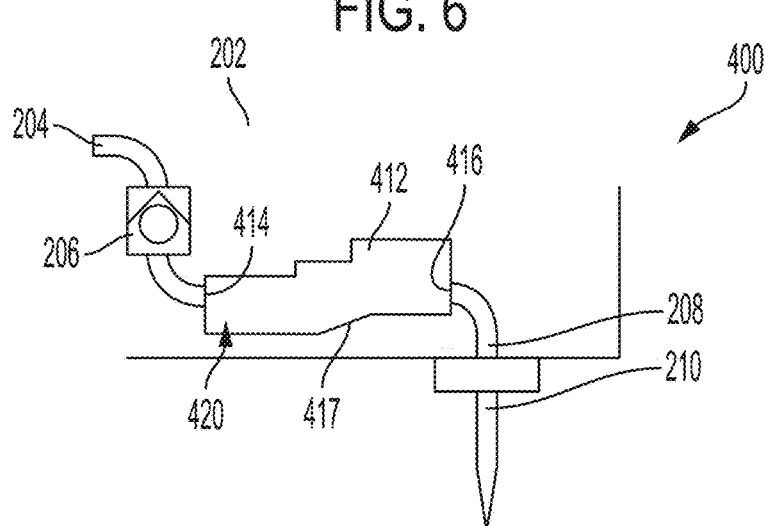
FIG. 7 is a schematic of another embodiment of a brewing system.
Figure 8:
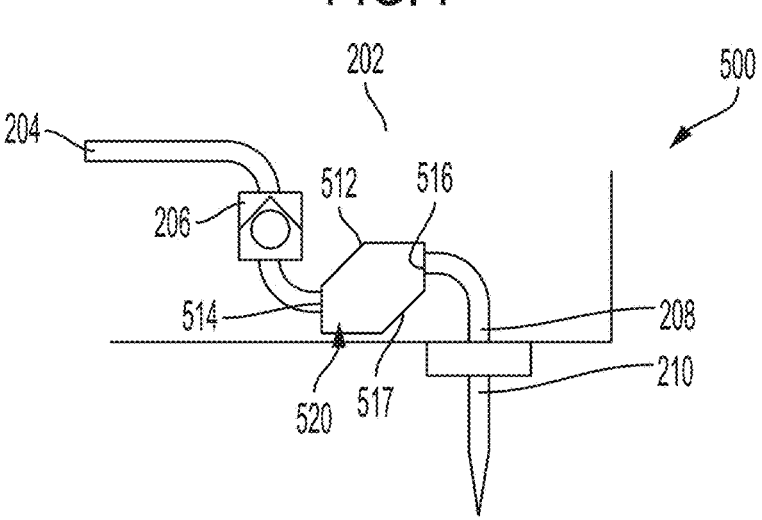
FIG. 8 is a schematic of another embodiment of a brewing system.

FIGS. 6-8 depict alternative embodiments of a brewing system including a beverage ingredient chamber. In the embodiment of FIG. 6, the chamber 312 of the brewing system 300 includes a chamber inlet 314 disposed on a sidewall (e.g., vertically oriented wall) of the chamber. A chamber outlet 316 is disposed on a bottom wall (e.g., horizontal wall) of the chamber. The chamber inlet 314 and chamber outlet 316 are disposed on approximately same level, with the chamber inlet positioned slightly above the chamber outlet. However, a catch volume 320 is disposed below both the chamber inlet and outlet, and is defined by a barrier 317 (e.g., a ramp) between the chamber inlet and chamber outlet. In the embodiment of FIG. 7, the chamber 412 of the brewing system 400 includes a chamber inlet 414 and a chamber outlet 416 both positioned on opposing sidewalls (e.g., vertically oriented walls) of the chamber. As in the embodiment of FIG. 6, the chamber inlet 414 and chamber outlet 416 are disposed on approximately the same horizontal level. The catch volume 420 is disposed below both the chamber inlet and the chamber outlet, and is defined by a barrier 417 (e.g., a ramp) between the chamber inlet and the chamber outlet. In the embodiment of FIG. 8, the chamber 512 of the brewing system 500 includes a chamber inlet 514 disposed on a sidewall of the chamber, and a chamber outlet disposed on an opposing sidewall of the chamber. In the embodiment of FIG. 8, the chamber outlet 516 is disposed above the chamber inlet 514. The catch volume 520 is positioned below both the chamber inlet and chamber outlet, and is defined by a barrier 517 (e.g., a ramp) between the chamber inlet and the chamber outlet. As discussed previously, in some embodiments, a catch volume may be disposed above or level with a chamber inlet and/or outlet.

Figure 9:
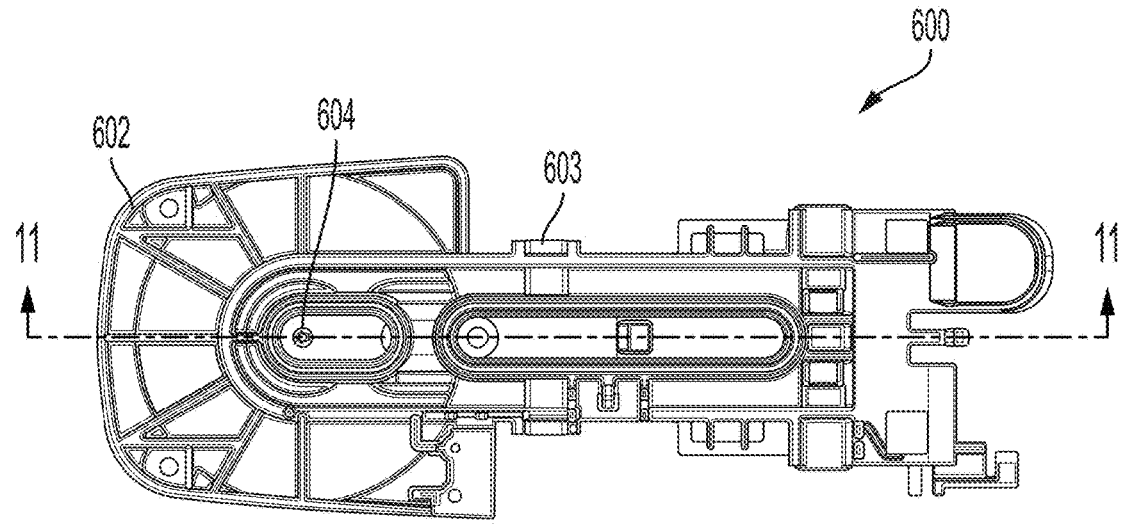
FIG. 9 is a bottom view of another embodiment of a brewing system.
Figure 10:
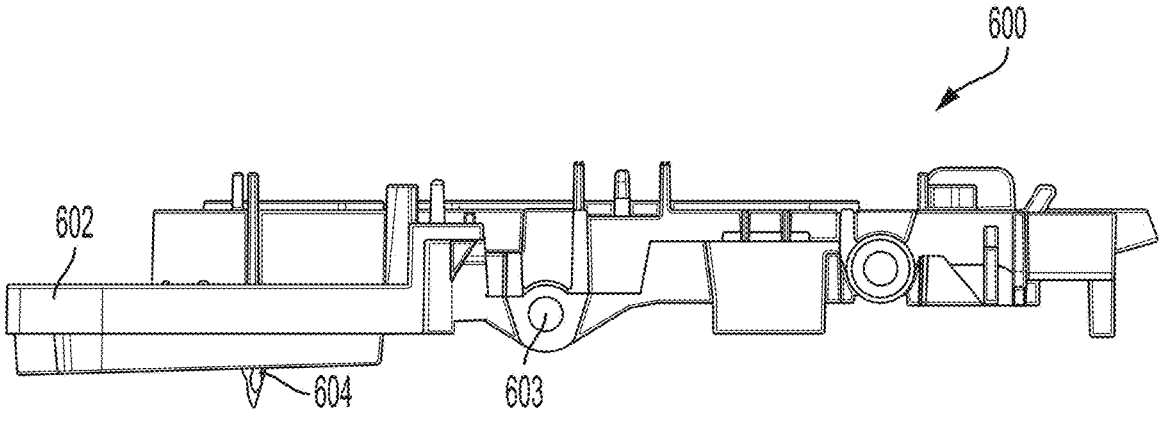
FIG. 10 is a side view of the brewing system of FIG. 9.

FIGS. 9-10 are a bottom view and side view, respectively, of another embodiment of a brewing system 600. As shown in FIGS. 9-10, the brewing system includes a brew head 602. The brew head of FIGS. 9-10 may be formed of injection-molded plastic, although other materials are contemplated. The brew head includes an integrated fluid supply system, which terminates in a fluid outlet 604 configured as a spike. The brew head includes a hinge 603 about which the brew head rotates into and out of engagement with an associated compartment.

Figure 11:
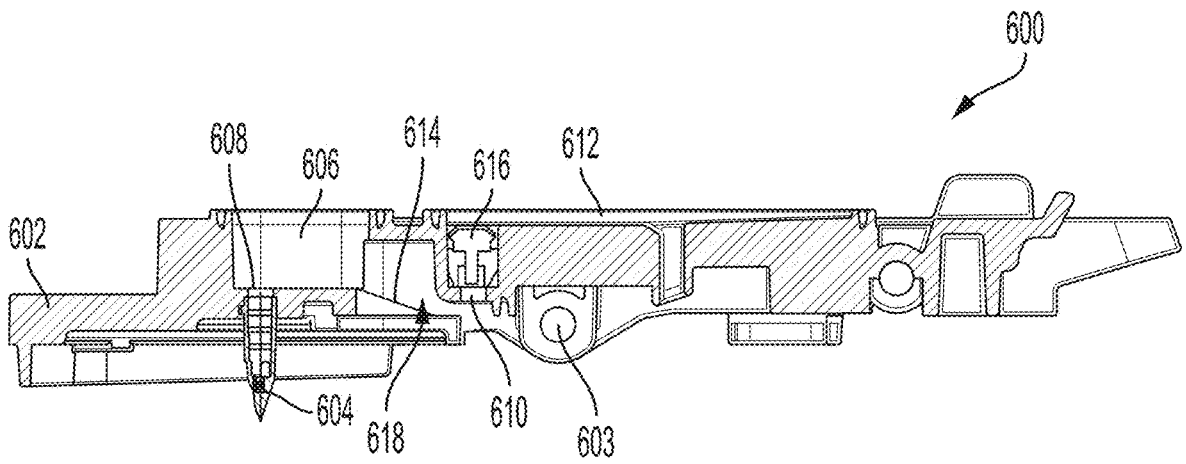
FIG. 11 is a cross-sectional view of the brewing system of FIG. 9 taken along line 11-11.

FIG. 11 is a cross-sectional view of the brewing system 600 of FIG. 9 taken along line 11-11 showing the fluid supply system of the brew head 602. As shown in FIG. 11, the fluid outlet 604 is connected to a beverage ingredient chamber 606 configured to catch and/or allow solid particles to spread out. The fluid outlet is connected to a chamber outlet 608, which is formed on a bottom wall of the chamber 606. A chamber inlet 610 is connected to a check valve 616 on an opposite end of the chamber. The chamber inlet 610 is formed on a top wall of the chamber. In the embodiment of FIG. 11, the chamber inlet and outlet are positioned on approximately the same level, with the chamber inlet being positioned slightly below the chamber outlet. The check valve 616 is connected to a channel (e.g., tube) 612 which may be fluidly connected to a pump of the brewing system 600.

As shown in FIG. 11, the chamber 606 includes an inclined base 614 that defines a catch volume 618 near the chamber inlet 610. The catch volume 618 is defined by the inclined base 614 (e.g., a barrier) positioned between the chamber outlet 608 and the chamber inlet 610, allowing the catch volume to effectively trap solid particles that may be expelled into the chamber 606 when the fluid outlet 604 pierces an associated capsule.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A brewing machine, comprising:
   a fluid supply system including a fluid outlet, the fluid outlet constructed and arranged to pierce a capsule;
   a chamber in fluidic communication with the fluid supply system and positioned upstream of the fluid outlet, the chamber including a chamber inlet, a chamber outlet, and a catch volume, wherein the catch volume is defined by a barrier between the chamber inlet and the chamber outlet; and
   a capsule compartment disposed downstream of the fluid outlet,
   wherein the chamber is constructed and arranged to catch solid particles in the catch volume; and
   wherein the fluid supply system is configured to deliver heated fluid to the chamber inlet.

2. The brewing machine of claim 1, wherein the chamber is configured to receive solid particles from the capsule when the capsule is pierced by the fluid outlet.

3. The brewing machine of claim 2, further comprising the capsule, wherein pressure in the capsule forces the solid particles from the capsule into the chamber.

4. The brewing machine of claim 1, wherein the catch volume is further constructed and arranged to create a fluid suspension of solid particles in fluid flow from the chamber inlet to the chamber outlet, wherein the fluid supply system is configured to allow for the fluid suspension to exit the chamber through the fluid outlet.

5. The brewing machine of claim 1, wherein the barrier is an inclined base, wherein the inclined base has a lowermost portion nearer the chamber inlet than an uppermost portion of the inclined base.

6. The brewing machine of claim 1, wherein the barrier is a vertical wall positioned between the chamber inlet and chamber outlet.

7. The brewing machine of claim 1, wherein the catch volume is positioned below both the chamber inlet and chamber outlet.

8. The brewing machine of claim 1, wherein the chamber outlet is positioned above the chamber inlet.

9. The brewing machine of claim 1, wherein the chamber inlet is positioned above the chamber outlet.

10. The brewing machine of claim 1, wherein the chamber inlet is positioned level with the chamber outlet.

11. The brewing machine of claim 1, wherein the fluid outlet is configured to pierce a capsule disposed in the capsule compartment.

12. The brewing machine of claim 1, further comprising a check valve disposed upstream of the chamber inlet, wherein the check valve inhibits flow from the chamber through the chamber inlet.

13. The brewing machine of claim 1, further comprising a reservoir containing a volume of water, wherein the reservoir is fluidly connected to the chamber inlet.

14. The brewing machine of claim 13, further comprising a pump configured to move water from the reservoir through the chamber inlet, into the catch volume, and out of the chamber outlet to the fluid outlet.

15. The brewing machine of claim 1, wherein a cross-sectional area of the chamber inlet and chamber outlet is less than a cross-sectional area of the catch volume.

16. The brewing machine of claim 15, wherein the cross-sectional area of the catch volume is greater than a cross-sectional area of the fluid outlet.

17. The brewing machine of claim 1, wherein the chamber inlet is disposed on a top side of the chamber, and the chamber outlet is disposed on a bottom side of the chamber.

18. The brewing machine of claim 1, wherein the fluid outlet includes at least one spike.

19. The brewing machine of claim 1, wherein the chamber inlet is horizontally spaced from the chamber outlet so that fluid flows horizontally through at least a portion of the chamber.

20. The brewing machine of claim 1, wherein the chamber has a volume between 2 and 10 times greater than the fluid outlet.

21. The brewing machine of claim 1, wherein the fluid outlet is positioned less than 2 inches away from the chamber outlet.

22. The brewing machine of claim 1, wherein the chamber is disposed in a brew head of the brewing machine.

23. A method for operating a brewing machine, comprising:

causing solid particles of beverage material to flow into a fluid outlet of a fluid supply system from a capsule compartment disposed downstream of the fluid outlet;

catching the solid particles in a catch volume of a chamber positioned upstream of the fluid outlet, wherein the catch volume is defined by a barrier between a chamber inlet and a chamber outlet of the chamber;

wherein the chamber is constructed and arranged to catch the solid particles in the catch volume;

delivering heated fluid to the chamber inlet; and producing a fluid flow through the chamber from the chamber inlet to the chamber outlet, wherein the fluid flow exits the fluid supply system through the fluid outlet.

* * * * *